(12) United States Patent
Ho et al.

(10) Patent No.: US 9,419,911 B2
(45) Date of Patent: Aug. 16, 2016

(54) METHOD AND SYSTEM FOR PACKET JOB SCHEDULER IN DATA PROCESSING BASED ON WORKLOAD SELF-LEARNING

(71) Applicant: TELEFONAKTIEBOLAGET L M ERICSSON (PUBL), Stockholm (SE)

(72) Inventors: Edward Ho, Fremont, CA (US); Robert Hathaway, Sunnyvale, CA (US); Michael Feng, Mountain View, CA (US); Edmund C. Chen, Sunnyvale, CA (US); Stephan Meier, Los Altos, CA (US); Jayaram Beladakere, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 585 days.

(21) Appl. No.: 13/730,729

(22) Filed: Dec. 28, 2012

(65) Prior Publication Data

US 2014/0189083 A1    Jul. 3, 2014

(51) Int. Cl.
| | |
|---|---|
| *G06F 15/173* | (2006.01) |
| *H04L 12/863* | (2013.01) |
| *H04L 12/931* | (2013.01) |
| *H04L 12/891* | (2013.01) |
| *H04L 12/851* | (2013.01) |
| *H04L 12/823* | (2013.01) |
| *H04L 12/861* | (2013.01) |

(52) U.S. Cl.
CPC ............ *H04L 47/50* (2013.01); *H04L 47/2441* (2013.01); *H04L 47/32* (2013.01); *H04L 47/41* (2013.01); *H04L 49/00* (2013.01); *H04L 49/90* (2013.01); *Y02B 60/33* (2013.01)

(58) Field of Classification Search
CPC ........................................................ H04L 47/50
USPC .................................................. 709/223, 217
See application file for complete search history.

(56) References Cited

U.S. PATENT DOCUMENTS

| | | | |
|---|---|---|---|
| 6,539,340 B1 * | 3/2003 | Robins et al. ................. | 702/186 |
| 8,917,738 B2 * | 12/2014 | Sundararaman et al. ..... | 370/412 |
| 2006/0045093 A1 * | 3/2006 | Choi ......................... | 370/395.4 |
| 2006/0136570 A1 * | 6/2006 | Pandya ........................ | 709/217 |
| 2013/0173717 A1 * | 7/2013 | Subramanian et al. ....... | 709/206 |

FOREIGN PATENT DOCUMENTS

| | | | |
|---|---|---|---|
| EP | 1885091 A2 * | 2/2008 | |
| WO | 0051290 A2 | 8/2000 | |

* cited by examiner

*Primary Examiner* — David Lazaro
*Assistant Examiner* — Marie Georges Henry
(74) *Attorney, Agent, or Firm* — Nicholson De Vos Webster & Elliott LLP (57) ABSTRACT

A method for packet job scheduler in data processing based on workload self-learning is disclosed. In response to receiving an incoming packet, the packet processor checks workload usage of an isolation group (IG) associated with the incoming packet, the IG being a classification of packets defined for the purpose of processing the incoming packet. The packet processor then determines whether the workload usage of the IG associated with the incoming packet exceeds a predetermined threshold. In response to the workload usage of the IG associated with the incoming packet not exceeding the predetermined threshold, the packet processor forwards the incoming packet to be executed by a packet execution unit, and then it updates the workload usage of the IG associated with the incoming packet based on execution of the incoming packet by the packet execution unit.

21 Claims, 10 Drawing Sheets

METHOD AND SYSTEM FOR PACKET JOB SCHEDULER IN DATA PROCESSING BASED ON WORKLOAD SELF-LEARNING

FIELD

The embodiments of the invention are related to the field of data processing in a network. More specifically, the embodiments of the invention relate to a method and system of efficient data processing.

BACKGROUND

In a data network, packet job scheduler attempts to control the volume and rate of data traffic (or traffic) being processed at network elements within a data network. A flow of data in a network is typically occurs in bursts, meaning that the flow will be high at times and low at other times, and not always a constant rate of data. Often multiple flows of data arrive at the network elements at the same time, and the network elements have to prioritize their data processing of the multiple flows to maximize network efficiency. Packet job scheduler (sometimes also referred to as traffic scheduling, or quality of service (QoS) management) may counter simultaneous flows of data with inconsistent arrival rates by de-bursting different flows at different time, i.e., smoothing high rate peaks and low rate troughs. The benefits of packet job scheduler are fair distribution of processing resources, maximization of processing efficiency, and reduced packet loss for the multiple flows of data. In addition, packet job scheduler allows a flow of data to be prioritized over other flows of data based on a perceived priority. Often a flow of data is governed by a service level agreement between the provider of the data network and a customer (or a tenant) of the data network. The service level agreement is translated to processing priority at one or more packet processor deployed by the provider, and the packet processor may slow down or speed up processing of a certain flow if the flow is deemed to use the resources above or below the agreed service level agreement. This kind of QoS management of data traffic is an important part of network engineering.

A number of ways of packet job scheduler have been proposed in prior art. For example, a network element (such as a packet processor) of the data network may use a scheduler to schedule processing of packets of various data flows based on a weighted round robin (WRR) method. In a WRR method, a flow may be given a percentage (i.e., weight) of the maximum processing rate (called "line rate"), say 30% for flow A of an agreed upon 300M bits per second rate to a processor of 1 Gigabit per second line rate, and the scheduler may accept the flow for processing by statistically complying with the percentage (statistically 30% of bits or packets processed being for flow A in a period of time), while accepting flows for processing of other flows with other predetermined percentages (i.e., round robin). A WRR method may be implemented using a token bucket algorithm where the token bucket contains a number of tokens (permit to transmit) for each flow based on a service agreement on the flow and processing of a flow is based on the availability of its tokens within the token bucket. Another example of packet job scheduler is that network elements of the data network may use a scheduler to schedule processing of packets of various data flows based on a maximum and/or minimum data rate. For example, the scheduler may dictate that a flow consumes a minimum of 10% of line rate regardless of bit rates of other flows coming to a network element. The guarantee of minimum bit rate provides a foolproof way to provide an agreed upon service level with a customer. At the same time, the guarantee for a flow may cause the network element to be less efficient in data processing given that the flow takes a minimum bandwidth under all circumstances (and the guarantee may be referred to as "actual partition" of bandwidth). Similarly, the scheduler may schedule processing of packet of various data flows based on a maximum and/or minimum data rates with similar benefits and disadvantages.

SUMMARY

A method implemented on a packet processor is disclosed. In response to receiving an incoming packet, the packet processor checks workload usage of an isolation group (IG) associated with the incoming packet, wherein the IG is a classification of packets defined for the purpose of processing the incoming packet, and wherein the workload usage of the IG is a measure of packet processing resources being consumed by the IG. The packet processor then determines whether the workload usage of the IG associated with the incoming packet exceeds a predetermined threshold. In response to the workload usage of the IG associated with the incoming packet not exceeding the predetermined threshold, the packet processor forwards the incoming packet to be executed by a packet execution unit, and then it updates the workload usage of the IG associated with the incoming packet based on execution of the incoming packet by the packet execution unit.

A network element configured to serve as a packet processor is disclosed. The network element comprises a scheduler, which is configured to check workload usage of an isolation group (IG) associated with an incoming packet, wherein the IG is a classification of packets defined for the purpose of processing the incoming packet, and wherein the workload usage of the IG is a measure of packet processing consumed by the IG. The scheduler is further configured to determine whether the workload usage of the IG associated with the incoming packet exceeds a predetermined threshold and to forward the incoming packet to be executed by a packet execution unit in response to determination that the workload usage of the IG associated with the incoming packet does not exceed the predetermined threshold. The network element also comprises a workload usage manager communicatively coupled with the scheduler, the workload usage manager being configured to provide workload usages of an IG to the scheduler, the workload usage manager being further configured to update workload usages of the IG associated with an incoming packet based on execution of the incoming packet.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 1, 3, 5, 8 and 10. However, it should be understood that the operations of flow diagrams in FIGS. 2, 4, 6, 7, and 9 can be performed by embodiments of the invention other than those discussed with reference to FIGS. 1, 3, 5, 8 and 10, and the embodiments discussed with reference to FIGS. 1, 3, 5, 8 and 10 can perform operations different than those discussed with reference to the flow diagrams of FIGS. 2, 4, 6, 7, and 9.

As used herein, a network element (e.g., a router, packet processor) is a piece of networking equipment, including hardware and software that communicatively interconnects other equipment on the network (e.g., other network elements, end systems). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public web-pages (e.g., free content, store fronts, search services), private web-pages (e.g., username/password accessed web-pages providing email services), and/or corporate networks over VPNs. Typically, subscriber end systems are coupled (e.g., through customer premise equipment coupled to an access network (wired or wirelessly)) to edge network elements, which are coupled (e.g., through one or more core network elements) to other edge network elements, which are coupled to other end systems (e.g., server end systems).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Note that embodiments of this invention also apply where the control plane and data plane are in separate network elements. In other words, a network element in embodiments of this invention may complete data plane functionalities while another network element complete control plane functionalities.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touch-screen, and/or a display), and network connections. The coupling of the set of processors and other components is typically through one or more buses and bridges (also termed as bus controllers). Thus, the storage device of a given electronic device typically stores code and/or data for execution on the set of one or more processors of that electronic device.

Figure 1:
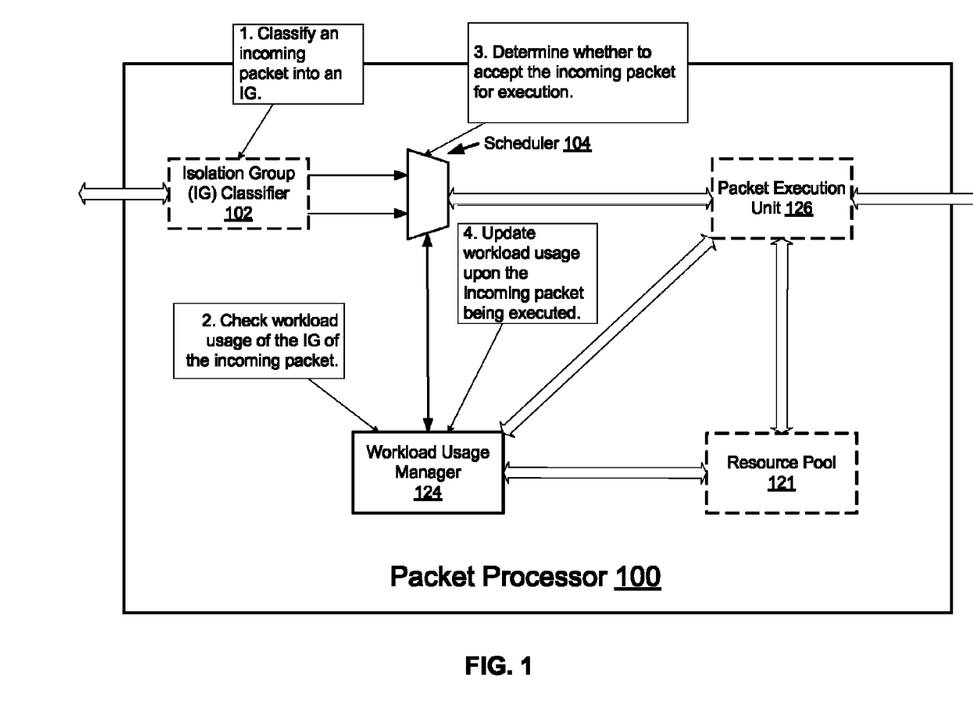
FIG. 1 is a block diagram illustrating a packet processing method based on workload self-learning implemented on a packet processor according to one embodiment of the invention.

FIG. 1 is a block diagram illustrating a packet processing method based on workload self-learning implemented on a packet processor according to one embodiment of the invention. In the prior art discussed herein above, scheduling of data process is determined by characteristics of data flow arrivals. A packet from an incoming data flow may be accepted for processing or delayed based on a pre-determined threshold characterizing allowable burst rate. For example, in a WRR method discussed herein above where 30% of bandwidth is reserved for a flow, a packet from the flow will be accepted for processing if accepting the packet does not cause the flow to make up more than 30% of overall packet being accepted by the packet processor. These kinds of methods have not taken into consideration of characteristics of workload of an incoming data flow caused within a packet processor. Yet using characteristics of workload of an incoming data flow may help better utilize processing resource thus make the packet processor more efficient.

Referring to FIG. 1, task boxes 1 to 4 illustrate the order in which operations are performed in packet processor 100 according to one embodiment of the invention. Packet processor 100 is a network element processing incoming packet flow. Packet processor 100 may contain multiple incoming ports to receive packets and multiple output ports to transfer packets after processing. While in one embodiment, incoming packet flow is a stream of data segments formatted by the network element (e.g., by an entity embedded within or communicatively coupled with packet processor 100), in alternate embodiments, the incoming packet flow may be same and/or different types of traffic (e.g., Ethernet traffic, Internet Protocol (IP), Asynchronous Transfer Mode (ATM), Frame Relay, Synchronous Optical Network (SONET), etc.). The individual modules in packet processor 100 can contain their dedicated network process units (NPU) or they can share NPUs among multiple modules. Note multiple modules or all modules within packet processor 100 may be integrated to one or more modules to execute a packet processing method herein.

At task box 1, an incoming packet of a data flow may be classified by isolation group (IG) classifier 102. IG classifier 102 may classify the incoming packet by assigning the incoming packet with an IG identifier (ID). One objective of assigning IG to incoming packets is to provide a certain level of performance assurance so that a certain amount of incoming packets within an IG are processed by packet processor 100, regardless the workloads that other IGs send to packet processor 100. The objective is important as often a certain data stream may take a disproportionally large amount of processing cycles and resources (or exceeding its allocated share of processing cycles and resources per service agreement) in packet execution, even if packets of the data stream do not arrive much more frequently than packets of other data streams. With classifying packets into various IGs and monitoring process cycle/time and resources consumed by these IGs (i.e., workload caused by these IGs), packet processor 100 is able to learn the actual workload caused by each IG. The learning is obtained by a packet processor in real-time or near real-time during packet processing performed by the packet processor or related packet processing modules, without acquiring the knowledge from a party outside of packet processor 100, thus the method is referred to as "workload self-learning" in this specification. With workload self-learning, a scheduler of a packet processor can identify/throttle rogue data stream(s) and protect normal data stream(s) by limiting workloads of some incoming data flows while offering process time and resources for workload of other data flows. The process of differentiating various data streams in packet processing is referred to as "virtual partition" of IGs, in contrast with "actual partition" in prior art. Note one IG may contain multiple data flows with different characteristics, that is, packets being classified to one IG may not be same types of packets, and these packets may also come from different sources and going to different destinations. The scheduler of a packet processor do not examine whether or not resources are consumed fairly within an IG.

In one embodiment, IG classifier 102 may assign the incoming packet an IG ID based on the incoming port of packet processor 100 from which the incoming packet is received (e.g., IG ID may be based on the port number of the receiving port of the incoming packet). In alternate embodiments, IG classifier 102 may assign the incoming packet an IG ID based on a variety of characteristics of the incoming packet, such as destination address, source address, customer, application type, packet data contents, virtual local area network (VLAN) tag, multi-protocol label switching (MPLS) tag, type of service (TOS) bits, differentiated services (diffserv) bits, and etc. IG classifier 102 may be a module of packet processor 100, but it may also be a separate entity or an entity within another network element communicatively coupled with packet processor 100. In one embodiment, assigning an IG ID to an incoming packet includes tagging the incoming packet with an IG ID so that the IG ID is embedded with the incoming packet throughout processing through packet processor 100. In one embodiment, after being processed through IG classifier 102, each and every packet within packet processor 100 is classified to an IG. In an alternate embodiment, not all packets are classified to IGs and the unclassified packets are treated as a group in prioritizing (e.g., all unclassified packets are processed on best-effort only basis that use only leftover resources).

Onward to task box 2, schedule 104 interacts with workload usage manager 124 and checks workload usage of the IG of the incoming packet. Workload usage manager 124, as discussed in more detail herein below, keeps records of workload usage of IGs. By checking workload usage manager 124, one may know the current status of workload usage of the IG that the incoming packet belongs to. In addition, workload usage manager 124 may contain workload allocation targets of IGs. Workload allocation targets are the target workload allocation an IG is allowed to have, and they may be used as workload thresholds of the IG when a scheduler determines whether or not to accept an incoming packet for processing. The workload allocation targets of an IG may be determined by a variety of factors, including a service level agreement associated with the IG. An IG may take more than its workload targets when other IGs take less than their workload targets (e.g., when resource is "undersubscribed"—some resources of the packet processor are idle). However, the workload allocation targets of an IG are what packet job scheduler is based on when workloads of the associated packet processor are "oversubscribed." Armed with workload usage information of the IG that the incoming packet belongs to, scheduler 104 determines whether to accept the incoming packet for execution at task box 3. When the decision is to accept the incoming packet for execution, the incoming packet may be forwarded to packet execution unit 126 for processing. When the decision is not to accept the incoming packet at the time, an alternate path may be taken, for example, the packet may be queued in a buffer for later processing, continue execution on a best-effort basis, or be discarded without being further processed.

At task box 4, packet processor 100 updates workload usage at workload usage manager 124. The update may happen while the incoming packet is executed at packet execution unit 126 or afterward. The update may be based on the result of packet execution unit 126 and/or resource pool 121. Resource pool 121 includes both physical resources and logical resources being used by packets as discussed in more detail herein below. The updated workload usage in workload usage manager 124 then can be used to determine whether to accept an incoming packet from the same IG in the future as the workload usage of the IG has been changed (and may be closer than workload allocation target of the IG than before). Note that packet execution unit 126 and resource pool 121 may be integrated into one module where all resources a packet execution takes are within the same resource pool. In addition, resource pool 121 may be integrated into workload usage manager 124 where workload usage manager 124 knows all resources involved in packet processing of packet processor 100. In another embodiment, packet execution unit 126 and resource pool 121 are entities implemented in one or more network elements outside of packet processor 100, where the one or more network elements are communicatively coupled with packet processor 100.

Figure 2:
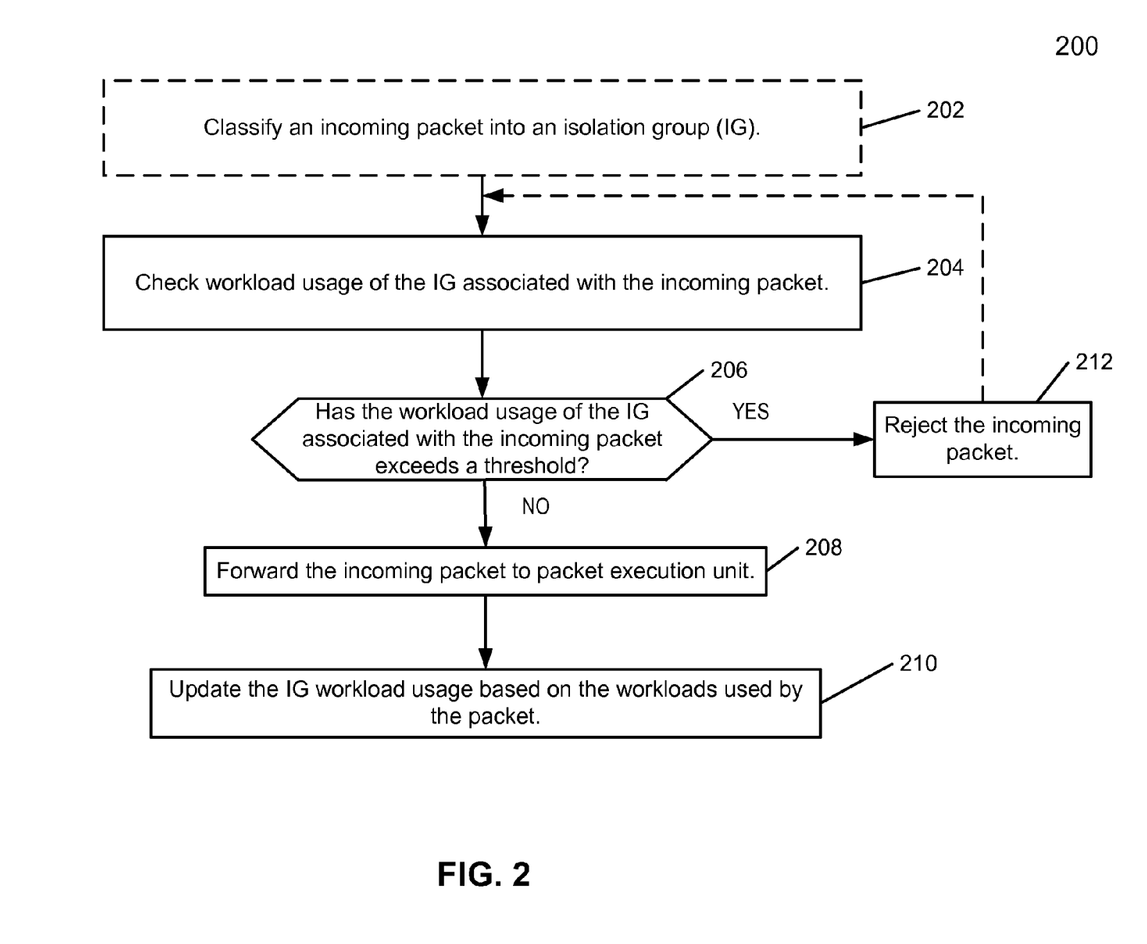
FIG. 2 is a flow diagram illustrating a packet processing method based on workload self-learning implemented on a packet processor according to one embodiment of the invention.

FIG. 2 is a flow diagram illustrating a packet processing method based on workload self-learning implemented on a packet processor according to one embodiment of the invention. Method 200 may be implemented on packet processor 100 of FIG. 1. Method 200 may optionally start with reference 202, where an incoming packet is classified into an IG. Reference 202 may not be required in method 200 when another method has already classified the incoming packet into an IG. Also, some packet may not be assigned to any IG as discussed herein above, in which case reference 202 may not be required. At reference 204, workload usage of the IG associated with the incoming packet is checked. The workload usage of the IG may be represented by a workload usage indication in an embodiment. Then at reference 206, the method determines whether the workload usage of the IG associated with the incoming packet exceeds a predetermined threshold. The predetermined threshold of a workload usage of an IG may be determined by a resource allocation target of the IG. The target resource allocation of an IG may in turn be determined by a variety of factors, including a service level agreement associated with the IG. If the workload usage of the IG associated with the incoming packet exceeds the predetermined threshold, the incoming packet is rejected at reference 212. The rejected incoming packet may be discarded without being processed in some embodiments. In another embodiment, the rejected incoming packet may be queued in a buffer (to be processed later), or executed at a best-effort basis. In the case of the packet being queued in a buffer, the rejected incoming packet will go through reference 204 again in a later time.

If the workload usage of the IG associated with the incoming packet is below the threshold of the workload usage of the IG, the incoming packet is forwarded to packet execution unit at reference 208. The packet is then executed, using processing cycles of the packet execution unit and taking up resources of a resource pool associated with the packet processor. The IG workload usage for the IG is then updated at reference 210, in consideration of added processing cycles of the incoming packet and resources taken in the resource pool.

In some embodiment, a workload usage threshold may be updated by IG workload usage. Initially the workload usage threshold may be configurable for each IG and the configuration is at least in part based on characteristics of each IG. The characteristics of each IG include customers and service agreements associated with the customers, service type of the IG, predetermined processing priority of the IG. The configured workload usage threshold may be updated as the associated packet processor performs workload self-learning. For example, the associated packet processor may find that an IG crosses a workload usage threshold often in packet processing (thus its packets are throttled) when the packet streams of the IG have legitimately changed characteristics (a customer has started video streaming instead of audio streaming, thus more workload is generated), the workload usage threshold may be updated to synchronize with changed workload characteristics of the IG. Thus, workload learning can be applied to update workload usage thresholds.

Note that an IG may have a number of workload usages and a packet processor may have a number of corresponding workload usage thresholds. Exceeding one or more workload usage may cause the incoming packet to be rejected, thus references 204-210 may be executed multiple times concurrently or sequentially where each run makes determination of threshold crossing on one or more workload usages. The packet processor may also be configured to make rejection determination based on multiple workload usages using certain ranking/weighing criteria of workload usage thresholds.

Figure 3:
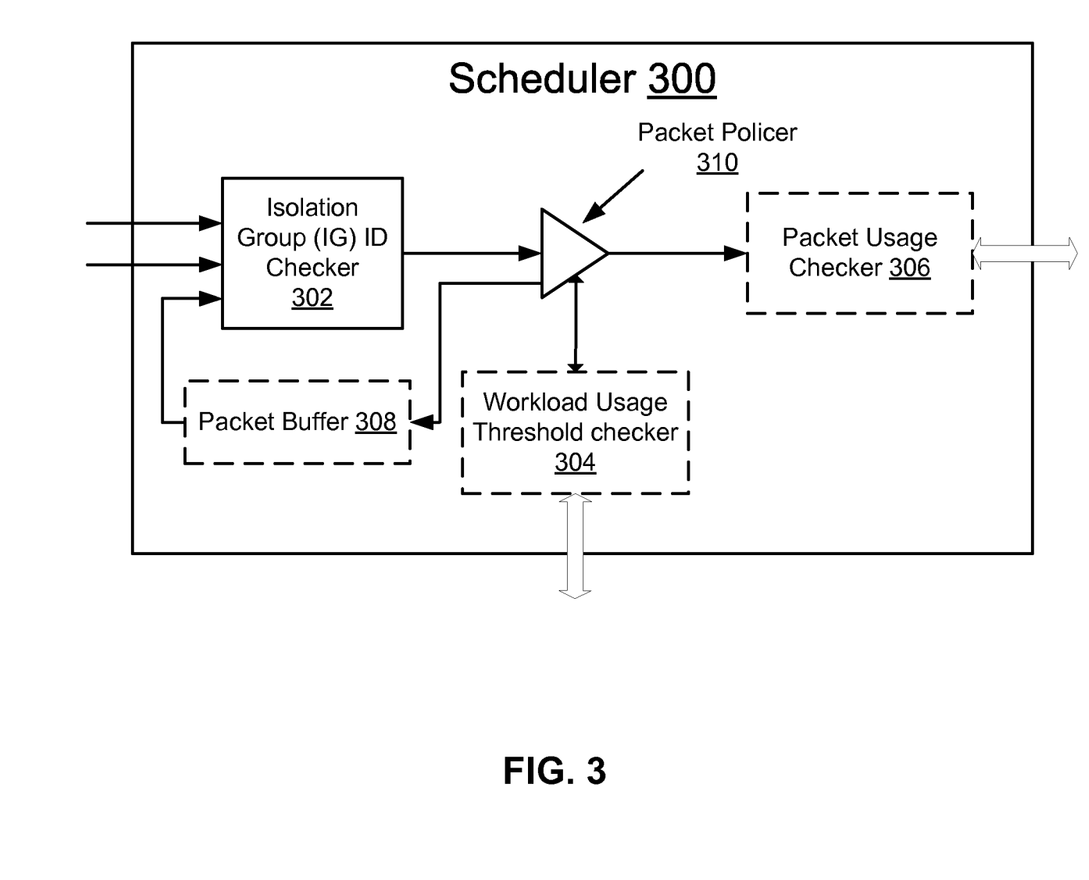
FIG. 3 is a block diagram illustrating a scheduler implemented on a packet processor according to one embodiment of the invention.

FIG. 3 is a block diagram illustrating a scheduler implemented on a packet processor according to one embodiment of the invention. Scheduler 300 may be implemented within packet processor 100 of FIG. 1. An incoming packet is sent to IG ID checker 302 first to determine which IG the incoming packet belongs to. Afterward, the incoming packet is sent to packet policer 310 to determine whether or not to forward the incoming packet to packet execution unit for execution. In one embodiment, packet policer 310 checks workload usage threshold checker 304 embedded within scheduler 300 to find the threshold(s) associated with the IG the incoming packet belongs to and the current workload usages of the IG. In another embodiment, workload usage threshold checker 304 may be stored outside of scheduler 300 but within or communicatively coupled with the packet processor of scheduler 300 (for example, stored within workload usage manager 124 illustrated in FIG. 1).

When packet policer 310 determines that current workload usage of the IG associated with the incoming packet exceeds the threshold or thresholds of the IG, the incoming packet can be rejected. The rejected incoming packet may be discarded without processing in some embodiments. In other embodiments, the rejected incoming packet may be saved to packet buffer 308. In yet other embodiments, only a rejected incoming packet belonging to specific IGs may be saved to packet buffer 308, so that the packet processor may give packets within some higher priority IGs additional chances to be executed. Packet buffer 308 may be a single packet queue that holds all of the packets waiting to be executed. In alternate embodiments, there are multiple queues for packets of different types such as one queue for packet belongs to each IG. The rejected packets in packet buffer 308 may be routed to IG ID checker 302 in a later time to determine if the rejected packets may be allowed to be executed. The delay of packet buffer 308 may be a predetermined time or a predetermined condition such as workload usage reaches to a certain threshold (e.g., when the packet execution unit is undersubscribed). In an alternate embodiment, the rejected packets in packet buffer 308 may be queued for execution, but the execution is only on a best-effort basis. In other words, rejected packets are executed only after the other packets are executed first.

When packet policer 310 determines that current workload usage of the IG associated with the incoming packet is below the threshold or thresholds of the IG, the incoming packet can be forwarded for execution by a packet execution unit. In some embodiments, the incoming packet will be passed to packet usage checker 306 so that packet usage checker 306 knows an incoming packet of the associated IG will be executed, and it will check the workload usage of the IG while or after the incoming packet is executed by the packet execution unit. In alternate embodiments, the packet usage checker 306 may be stored outside of scheduler 300 but within or communicatively coupled with the packet processor of scheduler 300 (for example, stored within workload usage manager 124 illustrated in FIG. 1).

Figure 4:
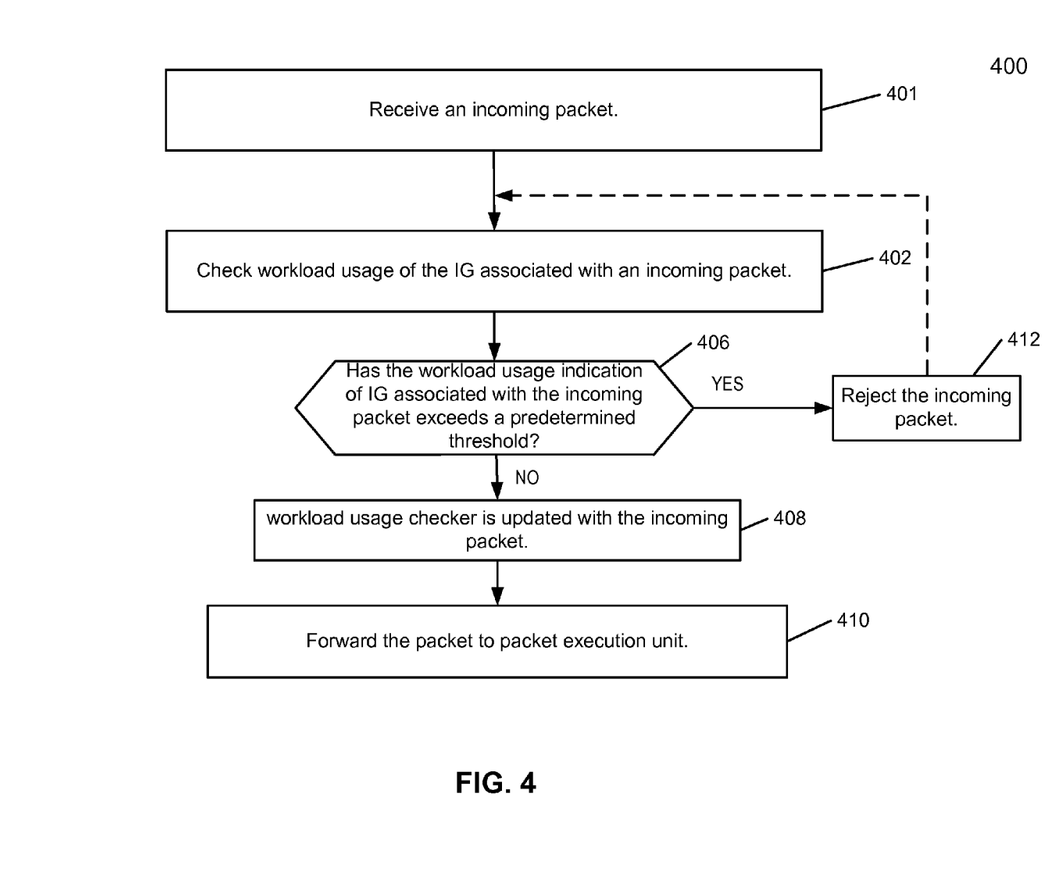
FIG. 4 is a flow diagram illustrating a packet processing method implemented on a scheduler of a packet processor according to one embodiment of the invention.

FIG. 4 is a flow diagram illustrating a packet processing method implemented on a scheduler of a packet processor according to one embodiment of the invention. Method 400 may be implemented on scheduler 300 of FIG. 3. Method 400 starts with reference 401, where an incoming packet is received. At reference 402, a workload usage of the IG associated with the incoming packet is checked. The workload usage of the IG may be represented by a workload usage indication. Then at reference 406, the method determines whether the workload usage indication indicates that the workload usage of the IG associated with the incoming packet exceeds a predetermined threshold. The predetermined threshold of a workload usage of an IG may be determined by resource allocation target of the IG. The target resource allocation of an IG may in turn be determined by a variety of factors, including a service level agreement associated with the IG. If the workload usage of the IG associated with the incoming packet exceeds the threshold, the incoming packet is rejected at reference 412. The rejected incoming packet may be discarded without being processed in some embodiments. In other embodiments, the rejected incoming packet may be queued in a buffer to be processed later. In that case the rejected incoming packet will go through reference 402 again at a later time.

If the workload usage of the IG associated with the incoming packet is below the threshold of the workload usage of the IG, a workload usage checker is updated to include the incoming packet waiting for execution at reference 408. The update makes the workload usage checker to check the workload usage of the IG while or after the incoming packet is executed by the packet execution unit. The incoming packet is then forwarded to packet execution unit at reference 410. The packet is then executed, using processing cycles of the packet execution unit and taking up resources of a resource pool associated with the packet processor.

Note that an IG may have a number of workload usages and a packet processor may have a number of corresponding workload usage thresholds. Exceeding one or more workload usage may cause the incoming packet to be rejected, thus references 402-408 may be executed multiple times concurrently or sequentially where each run makes determination of threshold crossing on one or more workload usages. The packet processor may also be configured to make rejection determination based on multiple workload usages using certain ranking/weighing criteria of workload usage thresholds.

Figure 5:
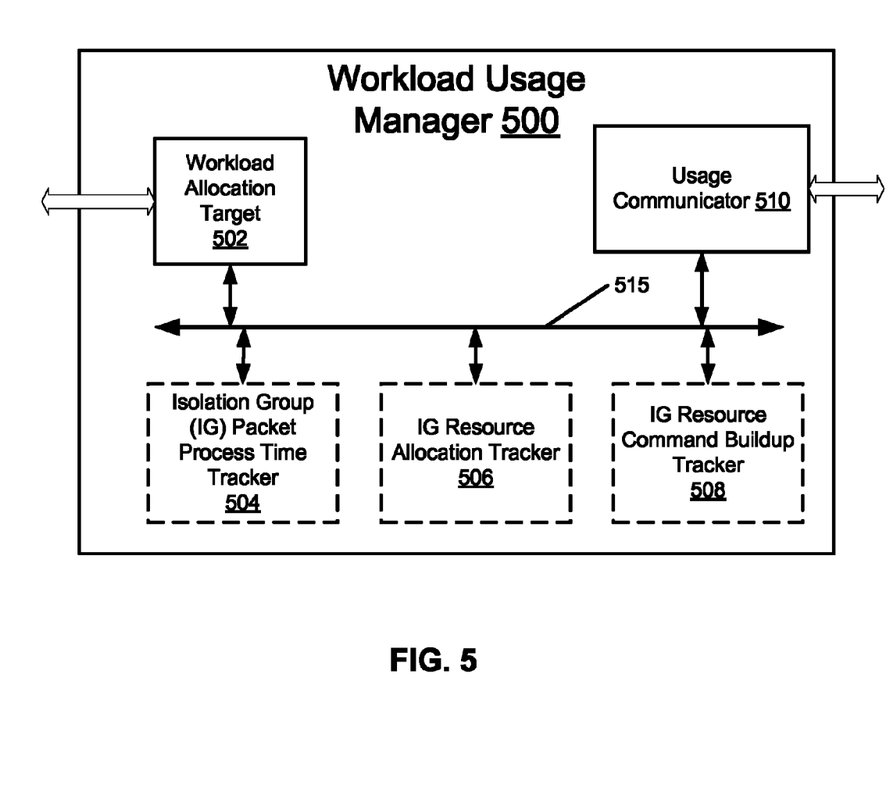
FIG. 5 is a block diagram illustrating a workload usage manager incorporating the method of workload self-learning according to one embodiment of the invention.

FIG. 5 is a block diagram illustrating a workload usage manager incorporating the method of workload self-learning according to one embodiment of the invention. Workload usage manager 500 contains workload allocation target 502, usage communicator 510, and they may be communicatively coupled with IG packet process time tracker 504, IG resource allocation tracker 506, and IG resource command buildup tracker 508 via an interconnect 515, which may be a bus connection in one embodiment. Workload allocation target 502 contains target usages of IGs being executed through a packet processor. Workload allocation target may be dictated by a service agreement for a particular IG (e.g., when an IG is associated with a particular customer that demands a certain minimum level of execution resource). Workload allocation target may also be formulated by workload usage manager 500 based on a fair distribution of resources or other criteria that a packet processor determines to be useful in effectively utilizing packet processing resources. Usage communicator 510 communicates workload usage related information with other modules of a packet processor or other network elements related to process resources, such as packet execution unit, resource pool, and scheduler. Using workload usage related information via usage communication 510, IG packet process time tracker 504, IG resource allocation tracker 506, and IG resource command buildup tracker 508 may be updated and their data may be used by other modules that are communicatively coupled with workload usage manager 500.

Workload resource usage for packet execution may be tracked by, individually or in combination of, IG packet process time tracker 504, IG resource allocation tracker 506, and/or IG resource command buildup tracker 508. IG packet process time tracker 504 tracks usage of per packet processing cycle time in aggregation. A processing cycle time of a packet may be defined as the number of processor cycles between the first instruction to the last instruction to process the packet, excluding the number of clocks in which the process of packet is waiting for scheduling. The processing cycle time may include active instruction execution time, instruction stall caused by delayed processing of instruction, and data stall caused by delayed processing of packet. IG packet process time tracker 504 may keep track of packet processing time for an aggregated number of packets within each IG for a certain period of time (for example, using a counter for each IG). The aggregated packet processing time for each IG is an indication of processing/executing resource an IG has taken, and the tracking result may be compared to workload allocation targets stored in resource allocation target 502 to determine whether an IG has gone over its allowed workload usage.

Instead of tracking processing time like IG packet process time tracker 504, IG resource allocation tracker 506 tracks resource usage on a per packet basis for each IG over a period of time. The average resource usage is used to compute the expected line rate that can be supported by each IG. As discussed in more detail herein below, each resource related to processing packet is required to keep track of a current accumulative access count on each IG. IG resource allocation tracker 506 collects the current accumulative access counts of resources related to process packet through either periodical polling to the resources or the resources periodical pushing access counts. IG resource allocation tracker 506 may determine an average resource usage for each IG, and compare to resource allocation target stored in resource allocation target 502 to determine whether an IG has gone over its allowed usage.

In addition or alternatively, IG resource command buildup tracker 508 may also be implemented to track workload usage by an IG. Each resource may keep track of a command depth of the resource, and the command depth indicates the number of current commands in waiting to use the resource. The tracking of IG resource command buildup tracker 508 is then compared to a number of thresholds stored workload allocation target 502. One threshold may be an aggregate global high/low threshold, crossing of which triggers packets from all IGs rejected by a scheduler of the associated packet processor in one embodiment. In an alternate embodiment, each IG may still be allowed to have a predetermined minimum number of packets forwarded for execution. The aggregate global high/low threshold is useful to prevent major breakdown of the associated packet process. Once no packet or only minimum number of packets can be forwarded to associated execution units (since all/most incoming packets are rejected), the associated packet processor may be reset and restored to normal. Another threshold may be a per IG high/low threshold, crossing of which triggers rejection of packet for a specific IG. The per IG high/low threshold is useful to prevent one or more rogue IG slowing down packet processing of other IGs. Note that different combinations of IG packet process time tracker 504, IG resource allocation tracker 506, and IG resource command buildup tracker 508 may be implemented in different embodiments within the spirit of the invention. Also note that one or more modules may be implemented within a network element configured to be a packet processor, or they may be implemented within another network element communicatively coupled to a packet processor.

Figure 6:
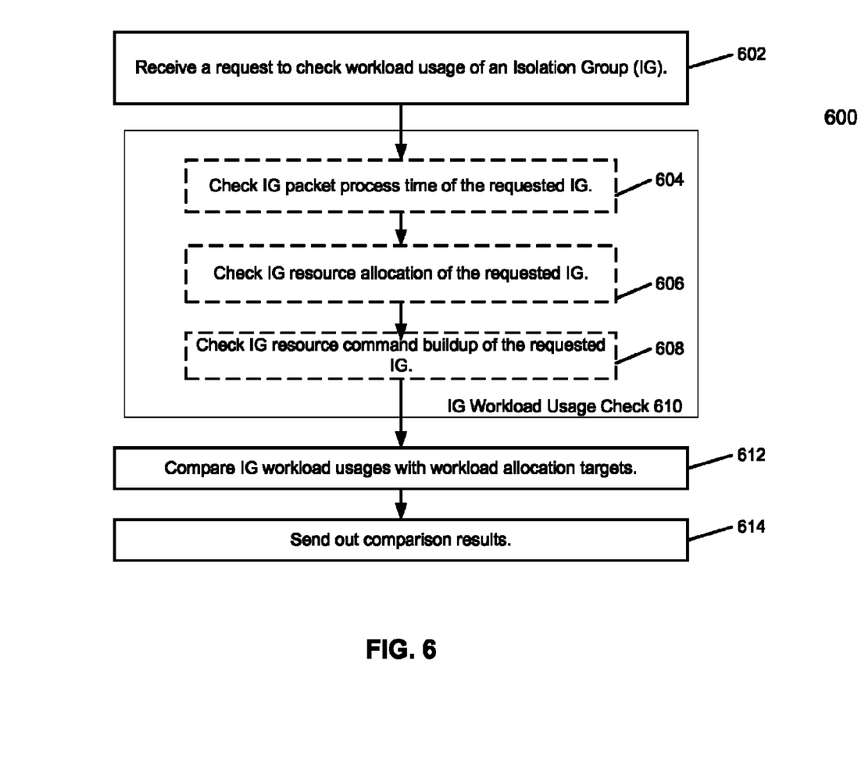
FIG. 6 is a flow diagram illustrating a method of checking workload usage incorporating the method of workload self-learning according to one embodiment of the invention.

FIG. 6 is a flow diagram illustrating a method of checking workload usage incorporating the method of workload self-learning according to one embodiment of the invention. Method 600 may be implemented in workload usage manager 124 in FIG. 1. At reference 602, a request to check a workload usage of a specifically requested IG is received. The method then goes to IG workload usage check box 610. One or more of references 604-608 may be included in IG workload usage check box 610 in an embodiment. The checking of references 604-608 may be executed in a variety of orders when more than one checking is implemented. At reference 604, IG packet process time of the requested IG is checked. The checking may be based on a data retrieval of IG packet process time tracker 504 of FIG. 5. At reference 606, IG resource allocation of the requested IG is checked. The checking may be based on a data retrieval of IG allocation tracker 506 of FIG. 5. At reference 608, IG resource command buildup of the requested IG is checked. Similarly, the checking may be based on a data retrieval of IG resource command buildup tracker 508 of FIG. 5. One or more of the checking results are then compared at reference 612 to workload allocation targets for the requested IG and for the specific parameter(s), such as aggregated packet process time of the IG, average resource allocation per packet of the IG, and per IG high/low threshold for command buildup. The comparison result is sent out at reference 614 to help the associated scheduler to determine whether or not to accept an incoming packet of the requested IG.

Figure 7:
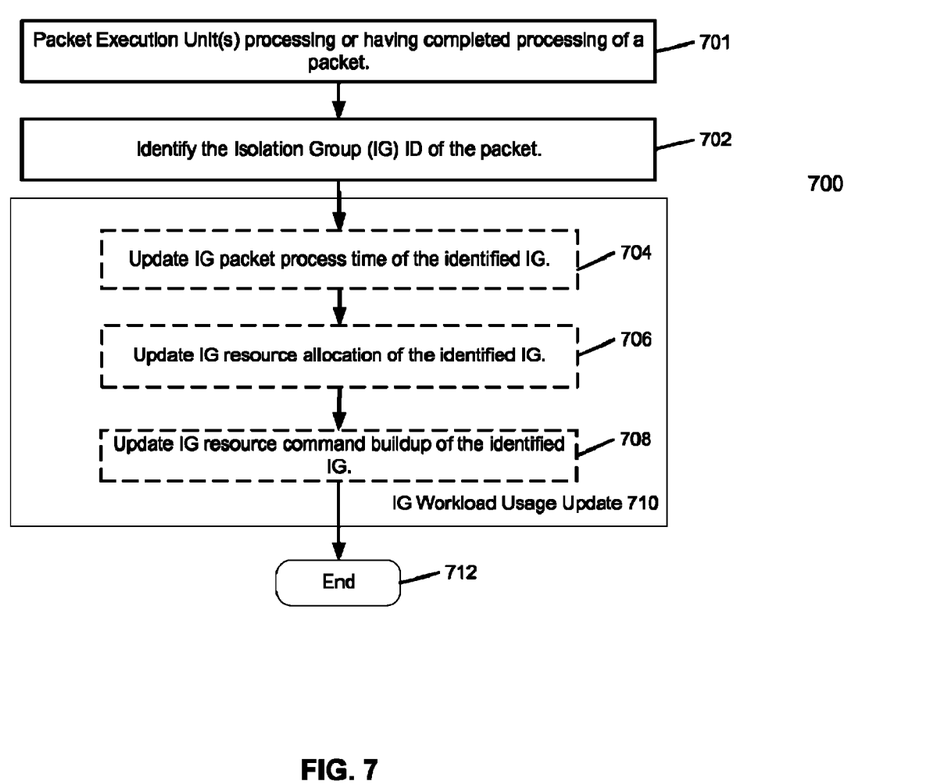
FIG. 7 is a flow diagram illustrating a method of updating workload usage incorporating the method of workload self-learning according to one embodiment of the invention.

FIG. 7 is a flow diagram illustrating a method of updating workload usage incorporating the method of workload self-learning according to one embodiment of the invention. The method starts at reference 701. In one embodiment, the method starts when a packet is being processed by packet execution units. In another embodiment, the method does not start for the packet until the packet has already been processed by packet execution unit. The identification of the IG is identified at reference 702. Then the workload usage is updated in IG workload usage update box 710. One or more of references 704-708 may be included in IG workload usage update box 710 in different embodiments. The updating of references 704-708 may be executed in a variety of orders when more than one updating is implemented. At reference 704, IG packet process time of the identified IG is updated to include the processing time of the packet. The updating may be implemented on IG packet process time tracker 504 of FIG. 5. Note reference 704 may not be applicable if method 700 starts before the packet is processed by packet execution unit as the whole process time may not yet be available for calculation at the time. At reference 706, IG resource allocation of the identified IG is updated to include the resource usage of the packet. The updating may be implemented on IG allocation tracker 506 of FIG. 5. Similarly, reference 706 may not be applicable if method 700 starts before the packet is processed by packet execution unit. At reference 708, IG resource command buildup of the identified IG is updated. The updating may be implemented on IG resource command buildup tracker 508 of FIG. 5. After IG resource usage update box 710, the method ends at reference 712.

Figure 8:
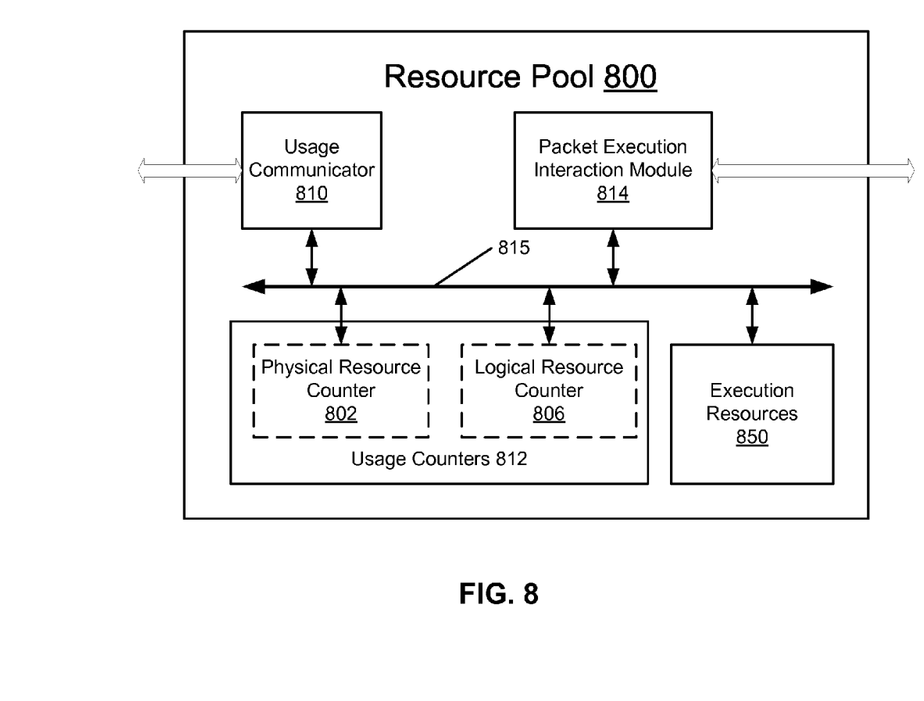
FIG. 8 is a block diagram illustrating a resource pool incorporating the method of workload self-learning according to one embodiment of the invention.

FIG. 8 is a block diagram illustrating a resource pool incorporating the method of workload self-learning according to one embodiment of the invention. Resource pool 800 contains usage communicator 810, packet execution interaction module 814, usage counters 812, and execution resources 850. These modules may be communicatively coupled via an interconnect 815, which may be a bus connection in one embodiment. Usage communicator 810 communicates resource usage related information with other modules of a packet processor or other network elements related to process resources, such as packet execution unit, workload usage manager, and scheduler. Using resource usage related information via usage communication 810, usage counters 812 may be updated and their data may be used by other modules communicatively coupled with resource pool 800. Packet execution interaction module 814 interacts with an associated packet execution unit. During packet execution, packet processor needs to use resources stored in resource pool 800, such as resources 850. Packet execution interaction module 814 processes requests/responses going between resource pool 800 and an associated packet execution unit.

Execution resources 850 represents resources associated with packet processing of an associated packet processor. Execution resources can be divided into at least two categories. One is physical resources for packet execution, and the other is logical resources for packet execution. Physical resources include a variety of memories, cache, and logic circuits used for packet execution. Logical resources include functional blocks that incoming packets are being processed through. Usage counter 812 may keep counting resource usages by each IG. Usage counters 812 may have a variety of counters. In one embodiment, usage counters 812 may keep a counter for physical resource usage using physical resource counter 802 and a counter for logical resource usage using logical resource counter 806 respectively. Since physical resources and logical resource may be configured to keep track of usage of each IG, the counters may be used to determine whether or not an IG has exceeded its resource allocation target.

Table 1 herein below illustrates a portion of an embodiment of combination of physical resource counters and their corresponding allocation targets. In some embodiments, table 1 may be implemented in resource pool 800. In alternate embodiments, table 1 may be implemented as a part of workload usage manager 500 illustrated in FIG. 5. Table 1 keeps track of memory accesses by isolation group number one (IG1). For each memory type, an allocation target (it may also be referred to as allocation "budget") is set, and a physical resource counter (such as physical resource counter 802) counts up access to the memory type when a packet from IG1 accesses to the memory type. For example, in Table 1, IG1 has been allocated N1 times to access ternary content addressable memory (TCAM). At this point in time, physical resource counter has counted that packets in IG1 has accessed TCAM X1 times. Assuming X1 is no greater than N1, a future packet of IG1 will be able to continue access to TCAM. Otherwise, the future packet of IG1 will be rejected.

TABLE 1

Physical Resource Counting Table for IG1

| Type of resources | Allocation Target | Physical Resource Counter |
|---|---|---|
| Ternary Content Addressable Memory (TCAM) Access | N1 | X1 |
| Doulbe data rate type 3 SDRAM (DDR3) MemoryAccess | N2 | X2 |
| Reduced latency DRAM (RL) Memory Access | N3 | X3 |
| embedded DRAM (eDRAM) Memory Access | N4 | X4 |

Table 2 herein below illustrates a portion of an embodiment of combination of logical resource counters and their corresponding allocation targets. In some embodiments, table 2 may be implemented in resource pool 800. In alternate embodiments, table 2 may be implemented as a part of workload usage manager 500 illustrated in FIG. 5. Table 2 keeps track of logical module accesses by IG1. For each module type, an allocation target (it may also be referred to as allocation "budget") is set, and a logical resource counter (such as logical resource counter 806) counts up access to the module when a packet from IG1 accesses the module in execution. For example, in Table 2, IG1 has been allocated N5 times to access random earlier drop (RED) module. At this point in time, logical resource counter has counted that packets in IG1 has accessed RED module X5 times. Assuming X5 is no greater than N5, a future packet of IG1 will be able to continue access to RED module. Otherwise, the future packet of IG1 will be rejected.

TABLE 2

Logical Resource Counting Table for IG1

| Type of resources | Allocation Target | Logical Resource Counter |
|---|---|---|
| Random Earlier Drop (RED) Module Access | N5 | X5 |
| Hierarchical Policer Module (HPM) Access | N6 | X6 |
| Search Lookup Engine (SLE) Module Access | N7 | X7 |
| Hardware Accelerator Engine (HAE) Module Access | N8 | X8 |

In some embodiments, resource counters and their corresponding allocation targets are stored in a data structure other than a table. For example, a data structure of array, tree, hash, object, or other may be used for resource usage monitoring. In addition, physical resource counters, logical resource counters and their corresponding allocation targets may be stored in together without separating the two or other types of counters.

Figure 9:
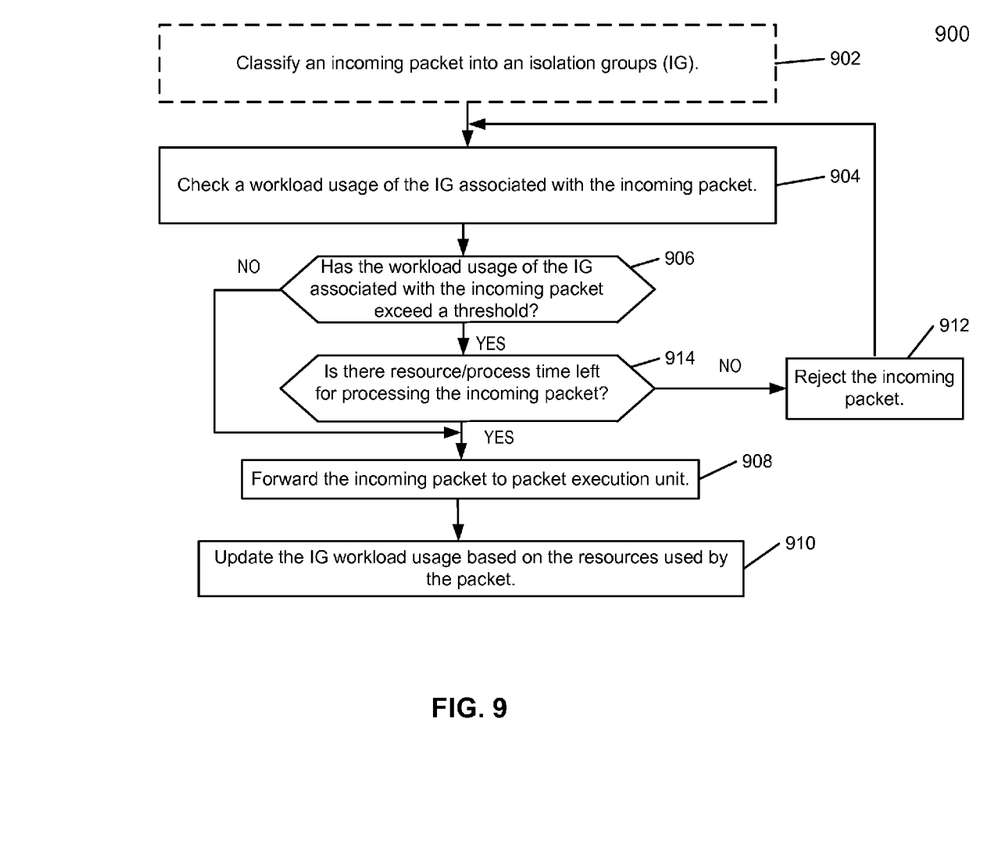
FIG. 9 is a flow diagram illustrating a packet processing method based on workload self-learning implemented on a packet processor according to one embodiment of the invention.

FIG. 9 is a flow diagram illustrating a packet processing method based on workload self-learning implemented on a packet processor according to one embodiment of the invention. FIG. 9 is similar to FIG. 2 and the similar references indicate steps having the same or similar actions or functionalities. Reference 914 is one additional block added to the flow diagram. After reference 906, a determination is made on whether the workload usage of the IG associated with the incoming packet exceeds a threshold. When the workload usage of the IG associated with the incoming packet exceeds the threshold, the incoming packet is not rejected as in FIG. 2. Instead, the incoming packet undergoes another determination, where the method determines whether or not there is resource/process time left for processing the incoming packet. If there is resource/process time left (for example, the packet processor may be undersubscribed), the incoming packet will still be processed. The best-effort based process allows some IG go over their allocated workload target when the packet processor is underutilized, thus improving the efficiency of the packet processor.

Figure 10:
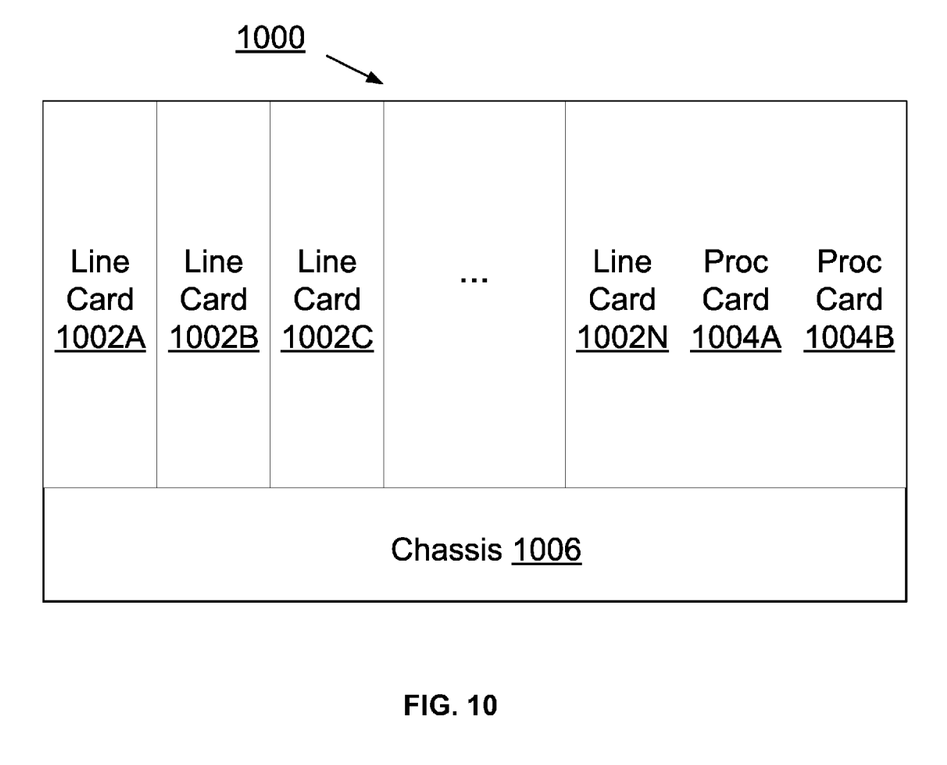
FIG. 10 is a block diagram illustrating a network element incorporating the method of workload self-learning according to one embodiment of the invention.

FIG. 10 is a block diagram illustrating a network element incorporating the method of workload self-learning according to one embodiment of the invention. Network element 1000 may contain embodiments of packet processor 100 of FIG. 1. While in one embodiment of the invention chassis 1006 is coupled to line cards 1002A-N and processing cards 1004A-B, other embodiments of the invention describe multiple other devices and/or modules coupled to chassis 1006. While in one embodiment, packet job scheduler based on resource usage may be part of line cards 1002A-N and/or processing cards 1004A-B, alternate embodiments may have alternate card arrangements (a combined line and processing card with one or more ports and a forwarding engine, one processing card per line card, multiple processing cards per line card, etc.). Network element 1000 includes line cards 1002A-N to forward packets.

This implementation of packet job scheduler based on resource usage is an example, and not by way of limitation. Thus, network elements having other architectural configurations can incorporate embodiments of the invention. Examples of other network elements that could incorporate embodiments of the invention may have multiple forwarding cards or have a single line card incorporating the functionality of both the forwarding and the controlling. Moreover, a network element having the forwarding functionality distributed across the traffic cards could incorporate embodiments of the invention.

The line cards 1002A-N and processor cards 1004A-B included in the different network elements and performing packet job scheduler based on resource usage include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented on a packet processor, the method comprising:
   in response to receiving an incoming packet, checking workload usage of an isolation group (IG) associated with the incoming packet, wherein the IG is a classification of packets defined for the purpose of processing the incoming packet, and wherein the workload usage of the IG is a measure of packet processing consumed by the IG;
   determining whether the workload usage of the IG associated with the incoming packet indicates that the workload usage of the IG exceeds a predetermined threshold;
   forwarding the incoming packet to be executed by a packet execution unit in response to the workload usage of the IG associated with the incoming packet not exceeding the predetermined threshold;
   rejecting the incoming packet in response to the workload usage of the IG associated with the incoming packet exceeding the predetermined threshold, wherein the rejection causes the incoming packet being either buffered, discarded, or being processed on a best-effort basis; and
   updating the workload usage of the IG associated with the incoming packet based on execution of the incoming packet by the packet execution unit.

2. The method of claim 1, further comprising classifying the incoming packet into an IG prior to checking the workload usage of the IG associated with the incoming packet.

3. The method of claim 1, wherein the predetermined threshold is configurable for each IG and the configuration is at least in part based on characteristics of each IG.

4. The method of claim 1, wherein the predetermined threshold is updated at least in part based on workload usages of packets executed through the packet processor.

5. The method of claim 1, wherein the workload usage of the IG associated with the incoming packet is calculated at least in part based on an average per packet processing cycle time of packets within the IG.

6. The method of claim 1, wherein the workload usage of the IG associated with the incoming packet is calculated at least in part based on an average per packet usage of resources of packets within the IG.

7. The method of claim 6, wherein the average per packet resource usage of packets within the IG is based on a plurality of resource counters counting resources used by packets within the IG.

8. The method of claim 7, wherein the plurality of resource counters comprises at least a logical resource counter counting a usage of logical resources by packets within the IG, wherein the logical resources include functional modules that the packets are being processed through.

9. The method of claim 7, wherein the plurality of resource counters comprises at least a physical resource counter counting a usage of physical resources, wherein the physical resources include memory modules that the packets are using or being processed through.

10. The method of claim 1, wherein the workload usage of the IG associated with the incoming packet is calculated at least in part based on a command depth measure of the IG in comparison to a command depth threshold.

11. A network element configured to serve as a packet processor, the network element comprising:
   a processor and a memory coupled to the processor, wherein the memory includes:
      a scheduler configured to check workload usage of an isolation group (IG) associated with an incoming packet, wherein the IG is a classification of packets defined for the purpose of processing the incoming packet, and wherein the workload usage of the IG is a measure of packet processing consumed by the IG,
      the scheduler further configured to determine whether the workload usage of the IG associated with the incoming packet does not exceed a predetermined threshold, and
      the scheduler further configured to forward the incoming packet to be executed by a packet execution unit in response to determination that the workload usage of the IG associated with the incoming packet does not exceed the predetermined threshold;
      a packet buffer configured to receive the incoming packet in response to determination that the workload usage of the IG associated with the incoming packet exceeds the predetermined threshold, wherein the determination that the workload usage exceeds the predetermined threshold causes the incoming packet to be either buffered for a future excution or current execution at a best-efford basis or discarded at the packet buffer; and
      a workload usage manager communicatively coupled with the scheduler, the workload usage manager being configured to provide workload usages of an IG to the scheduler, the workload usage manager being further configured to update workload usages of the IG associated with an incoming packet based on execution of the incoming packet.

12. The network element of claim 11, wherein the memory further includes an IG classifier configured to classify the incoming packet into an IG prior to checking the workload usage of the IG associated with the incoming packet.

13. The network element of claim 11, wherein the predetermined threshold is configurable for each IG and the configuration is at least in part based on characteristics of each IG.

14. The network element of claim 11, wherein the predetermined threshold is updated at least in part based on workload usages of packets executed through the packet processor.

15. The network element of claim 11, wherein the workload usage manager comprises an IG packet time tracker configured to calculate processing time of an IG, the calculation being at least in part based on an average per packet processing cycle time of packets within the IG.

16. The network element of claim 11, wherein the workload usage manager comprises an IG resource allocation tracker configured to calculate resource usage of an IG, the calculation being at least in part based on an average per packet resources usage of packets within the IG.

17. The network element of claim 16, wherein the memory further includes a resource pool, wherein the resource pool comprises a plurality of usage counters configured to count resources used by packets within the IG.

18. The network element of claim 17, wherein the resource pool comprises at least a logical resource counter, the logical resource counter being configured to count logical resources used by packets within the IG, wherein the logical resources include functional modules that the packets are being processed through.

19. The network element of claim 17, wherein the resource pool comprises at least a physical resource counter counting a usage of physical resources, wherein the physical resources including memory modules packets are using or being processed through.

20. The network element of claim 11, the workload usage manager further comprising an IG resource command buildup tracker configured to measure a command depth of an IG in comparison to a command depth threshold.

21. An apparatus processing packets, the apparatus comprising:
 a processor and a memory coupled to the processor, wherein the memory includes:
  an isolation group (IG) classifier configured to classify an incoming packet into an IG, wherein the IG is a classification of packets defined for the purpose of processing the incoming packet;
  a scheduler communicatively coupled with the IG classifier, the scheduler being configured to check workload usage of the IG associated with the incoming packet, wherein the workload usage of the IG is a measure of packet processing consumed by the IG,
   the scheduler further configured to determine whether the workload usage of the IG associated with the incoming packet exceeds a predetermined threshold, and
   the scheduler further configured to forward the incoming packet to be executed by a packet execution unit in response to determination that the workload usage of the IG associated with the incoming packet does not exceed the predetermined threshold;
  a packet buffer configured to receive the incoming packet in response to determination that the workload usage of the IG associated with the incoming packet exceeds the predetermined threshold, wherein the determination that the workload usage exceeds the predetermined thereshold causes the incoming packet to be either buffered for a future execution or current execution at a best-effort basis or discarded at the packet buffer; and
  a workload usage manager communicatively coupled with the scheduler, the workload usage manager being configured to provide workload usages of an IG to the scheduler, the workload usage manager being further configured to update workload usages of the IG associated with an incoming packet based on execution of the incoming packet.

* * * * *